(12) United States Patent
Nieuwkerk et al.

(10) Patent No.: US 7,728,927 B2
(45) Date of Patent: Jun. 1, 2010

(54) MIRROR WITH BUILT-IN DISPLAY

(75) Inventors: Armanda Cinderella Nieuwkerk, Eindhoven (NL); Martinus Hermanus Wilhelmus Maria Van Delden, Eindhoven (NL); Maria Henrica Wilhelmina Antonia Van Deurzen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 252 days.

(21) Appl. No.: 10/570,445

(22) PCT Filed: Aug. 20, 2004

(86) PCT No.: PCT/IB2004/051512

§ 371 (c)(1),
(2), (4) Date: Mar. 2, 2006

(87) PCT Pub. No.: WO2005/024500

PCT Pub. Date: Mar. 17, 2005

(65) Prior Publication Data

US 2007/0058109 A1 Mar. 15, 2007

(30) Foreign Application Priority Data

Sep. 9, 2003 (EP) .................................. 03103324

(51) Int. Cl.
*G02F 1/1335* (2006.01)

(52) U.S. Cl. ........................................ 349/96; 349/113
(58) Field of Classification Search .................. 349/93, 349/113
See application file for complete search history.

(56) References Cited

U.S. PATENT DOCUMENTS

| | | | | |
|---|---|---|---|---|
| 6,106,121 A * | 8/2000 | Buckley et al. | ............. | 359/839 |
| 6,417,892 B1 * | 7/2002 | Sharp et al. | ................. | 348/742 |
| 6,583,827 B2 * | 6/2003 | Faris et al. | .................... | 349/16 |
| 6,633,354 B2 * | 10/2003 | Li et al. | ...................... | 349/115 |
| 7,495,719 B2 | 2/2009 | Adachi et al. | | |
| 2004/0100598 A1 * | 5/2004 | Adachi et al. | ................ | 349/113 |

FOREIGN PATENT DOCUMENTS

| | | |
|---|---|---|
| EP | 0282086 A2 | 9/1988 |
| JP | 10108769 A | 4/1998 |
| JP | 2001318374 A | 11/2001 |
| JP | 2002122860 A | 4/2002 |
| JP | 2002229494 A | 8/2002 |
| WO | 03079318 A1 | 9/2003 |

\* cited by examiner

*Primary Examiner*—Frank G Font
*Assistant Examiner*—Eric Wong

(57) ABSTRACT

A mirror device may be simultaneously used for display purposes, based on e.g. an LCD display with a polarizing mirror placed in front of it. The polarizing mirror has the characteristics that it does not disturb the transmission of the light from the display to the viewer, but does reflect the incident light.

13 Claims, 4 Drawing Sheets

MIRROR WITH BUILT-IN DISPLAY

The invention relates to a polarizing mirror for viewing purposes having a first plane reflecting light of a first kind of polarization to a viewing side, the mirror passing light of a second kind of polarization and being provided with a display device at its non-viewing side, which display device during use provides light of the second kind of polarization. A "mirror for viewing purposes" or "display mirror" in this application refers to a mirror, via which a person's eye (or an artificial eye like a (infra-red) camera lens) sees a reflected part of the outside world. As examples one may think of large mirrors, like bathroom mirrors, full-length mirrors in fitting rooms or even mirrored walls. Other examples are medium sized mirrors, like outside mirrors for trucks or dressing-table mirrors.

By "having a first plane reflecting light of a first kind of polarization" it is meant that a mirror plane acts as a polarizing plane. When in use, light within a certain range of wavelengths of light incident on a polarizing plane will be divided in two components one which is reflected by the polarizing plane and one of which passes through the polarizing plane. Generally most known is the division of light in two components having linearly polarized, mutually perpendicular directions of polarization. On the other hand the light may be divided in right-handed and left-handed circular or elliptical polarization.

A display mirror of the kind mentioned above is described in the pending European Applications Ser. No. 02076069.2, filed on Mar. 18, 2002 and Ser. No. 02079306.3, filed on Oct. 17, 2002 (=PH NL 02.1038). The mirror function is obtained by introducing a polarizing mirror or reflective polarizer instead of a partly reflecting layer in front of a display device.

In general practice the reflectivity of such mirrors is chosen to be optimal, i.e. as high as possible. As a consequence preferably substantially all light, or as much light as possible should be reflected for optimal functioning. Nevertheless a mirror according to the invention reflects light of a first kind of polarization to a viewing side and passes light of a second kind of polarization, but moreover is provided with a display device at its non-viewing side, which display device during use provides light of the second kind of polarization.

The display device during use emits or reflects (polarized) light.

By adapting the polarization (direction) of the light of the second kind of polarization to polarization (direction) of the polarized light emitted by the display a transmission factor of substantially 100% is achieved, resulting in a high contrast of displayed information with respect to reflected images.

However when part of the mirror is used as a display the mirror function remains active in the other part of the mirror plane. The resulting reflections cause a deterioration of the daylight visibility and contrast. On the other hand when used as a mirror, only one polarization component is reflected so the reflectivity is only approx. 50%. Moreover, when the mirror size is larger than the display size and the display is off, differences may be visible between the (dark) display and the mirror background outside the display area. To overcome these problems preferably a switchable optical element is present between the display device and the viewing side of the polarizing mirror.

In one embodiment e.g. when the display is a liquid crystal display device, the switchable optical element is a switchable ½ λ plate.

In a further, preferred embodiment the viewing side of the polarizing mirror is provided with a switchable polarizer, based for instance on a guest-host system.

A problem however, especially in the reflecting mode is the angle dependence of the switchable optical element, be it a switchable ½ λ plate or a guest-host system. These components are based on electrically anisotropical oriented LC molecules and even at high voltages these molecules (if the liquid crystal material has a positive electrical anisotropy) do not reach a direction perpendicular to the substrates due to anchoring at said substrates. This implies that from one direction a viewer can be looking along the axes of said molecules, whereas from another direction a viewer sees the display having less brightness.

The present invention has as one of its goals to overcome these problems at least partially. A further object is to enhance the reflectivity of such a mirror display.

To this end a polarizing mirror according to the invention has at its viewing side polarizing means which are switchable between two optical states, the polarizing means comprising a liquid crystal layer between two substrates, at least one of said substrates having orientating means to orient liquid crystal molecules during one of the optical states in at least two orientation directions.

By introducing different orientation directions (in different, patterned domains) the attenuation of undesired reflection is increased when the polarizing mirror display is used in the mirror-mode. The attenuation is very effective, especially when the switchable polarizer is based on a guest-host system.

Different orientation directions (domains) can be obtained by using techniques generally known in LCD technology, like rubbing in different dictions, photo alignment (using masks), Langmuir-Blodgett layers, etcetera.

These and other aspects of the invention are apparent from and will be elucidated with reference to the embodiments described hereinafter.

In the drawings:

FIG. 1 is a possible embodiment of a mirror device according to the invention, while

Figures 4A, 4B:
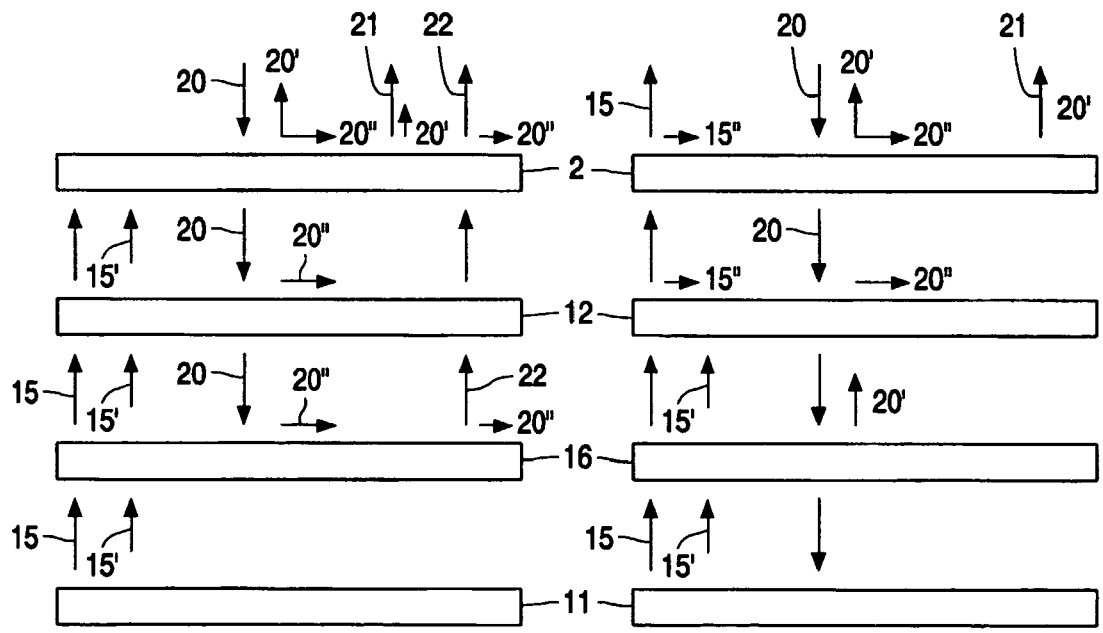
Figures 5A, 5B:
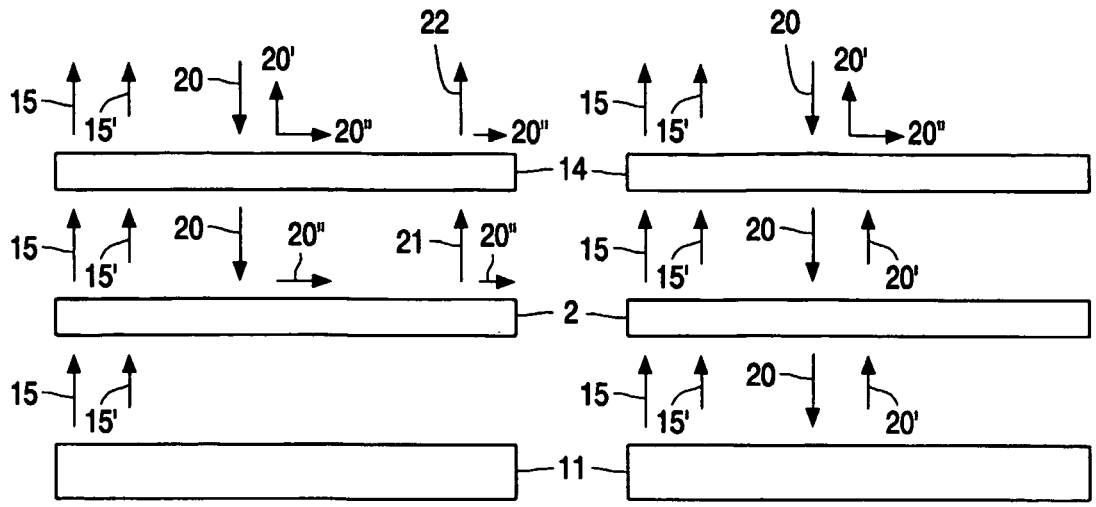
Figure 6:
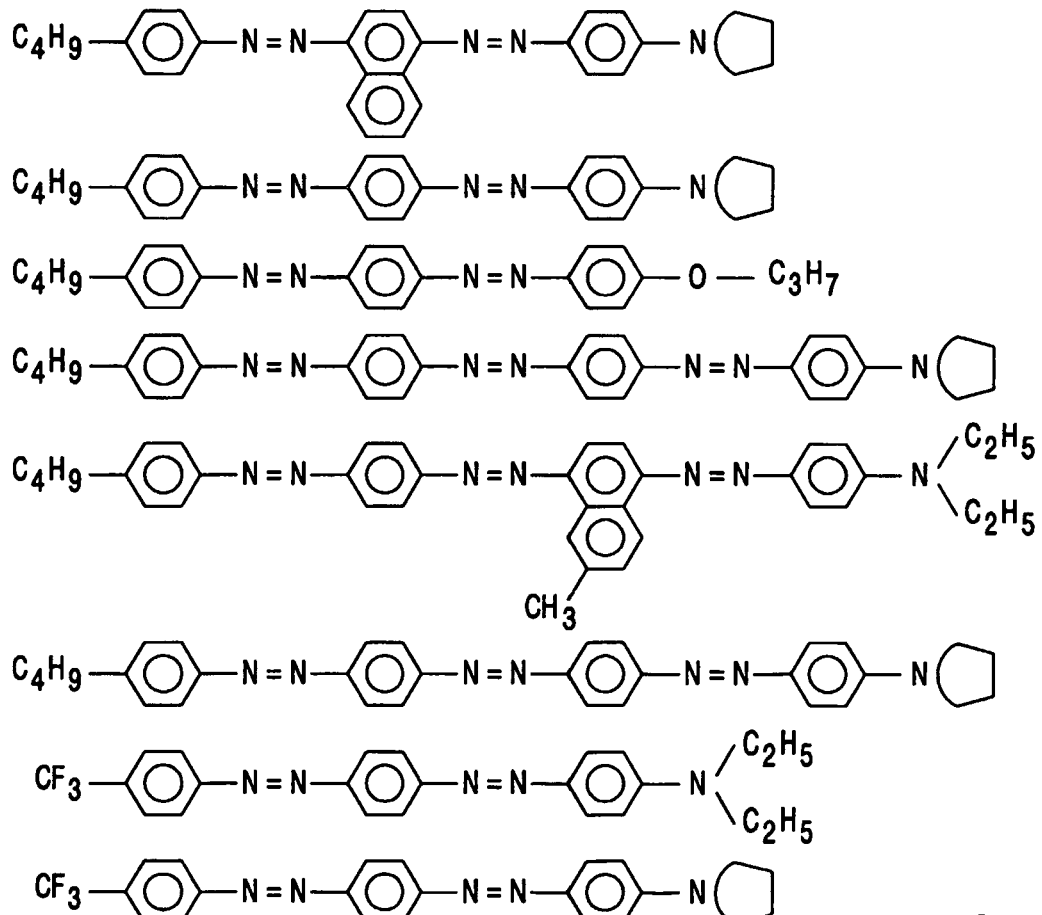
Figure 7:
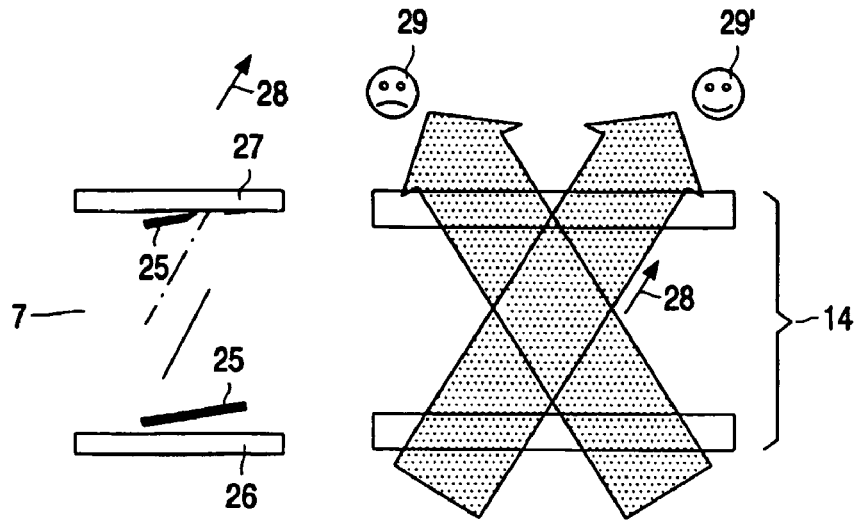
Figures 8A, 8B:
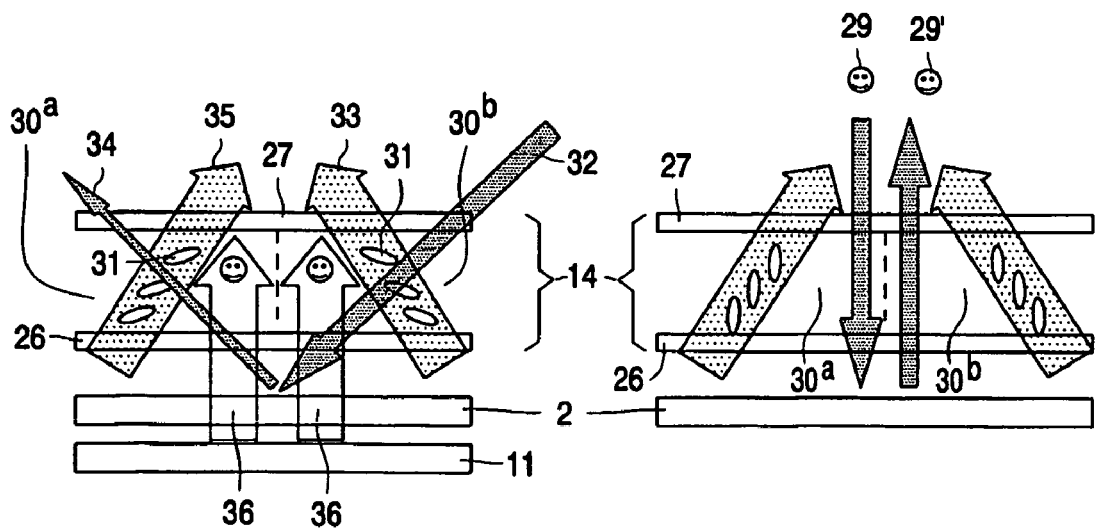

FIGS. 4 and 5 are a diagrammatic cross-section of a part of another mirror device to which the invention is applicable, FIG. 6 shows suitable dyes that can be added to liquid crystal mixtures to obtain a switchable polarizor, while FIG. 7 is a diagrammatic cross-section of a mirror device to explain the invention and FIG. 8 is a diagrammatic cross-section of a part of a mirror device according to the invention.

The Figures are diagrammatic and not drawn to scale. Corresponding elements are generally denoted by the same reference numerals.

Figure 1:
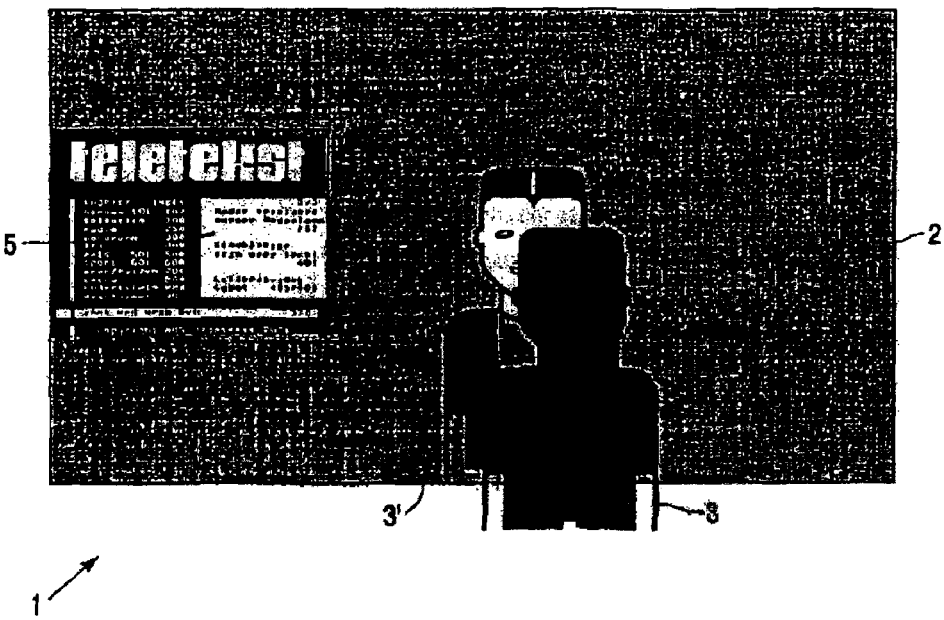
Figure 2:
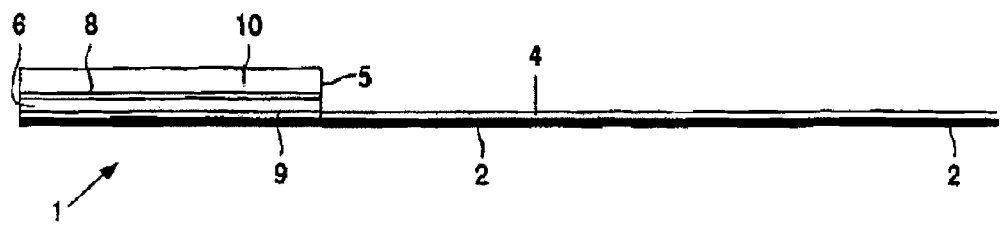
FIG. 2 is a diagrammatic cross-section of a part of a mirror device according to the invention.

FIG. 1 shows a mirror device 1 for viewing purposes having on a glass plate 4 a mirror 2 reflecting light, so a person 3 sees his image 3' (and further background, not shown). According to the invention the mirror (plane) only reflects light of a first kind of polarization (direction), but passes light of a second kind of polarization (direction). Furthermore the mirror is provided with a display device 5 at its non-viewing side (see also FIG. 2).

The display device 5 in this example is a liquid crystal display device having between two substrates (glass or plastic or any other suitable material) a liquid crystal material 6. Since most liquid crystal display devices are based on polarization effects the display 5 during use substantially emits polarized light. In general light from a backlight 10 is modulated by the liquid crystal display effect. Since the liquid crystal display device is based on a polarization effect the display 5 comprises a first polarizer 8 and a second polarizer (or analyzer) 9, which passes light of a certain polarization (direction).

This light of a certain polarization has the same (linear) polarization direction as the second kind of polarization (direction), so it passes the mirror (plane) 2 without any loss of light (100% transmission).

Since most liquid crystal display devices are based on modulation of linearly polarized light, linear polarizers 8, 9 are used, and the mirror 2 also is a linear polarization selective mirror e.g. a stack of dielectric layers, each layer having an optical thickness of one-quarter of a selected wavelength (or a mean value for a spectrum), while the layers have selected refractive indices. Another possibility is the use of so-called wire grid polarizer (a grid of thin conducting wires) that is transmissive for one polarization and reflective for the orthogonal polarization.

If the mirror and the display device are rotatable with respect to each other with respect to an axis substantially perpendicular to the first plane the transmission factor for the polarized light emitted by the display is variable, since it depends on the angle between the polarization (direction) of the modulated light and the polarization axis of the light which passes the mirror 2. In this way images from the display can be dimmed or completely turned off, if wanted, by simply rotating the mirror.

On the other hand in certain applications it may even be attractive to polarize light from e.g. an (O)LED or other display to obtain the effect of a high contrast of displayed information with respect to reflected images in mirror applications.

Figure 3:
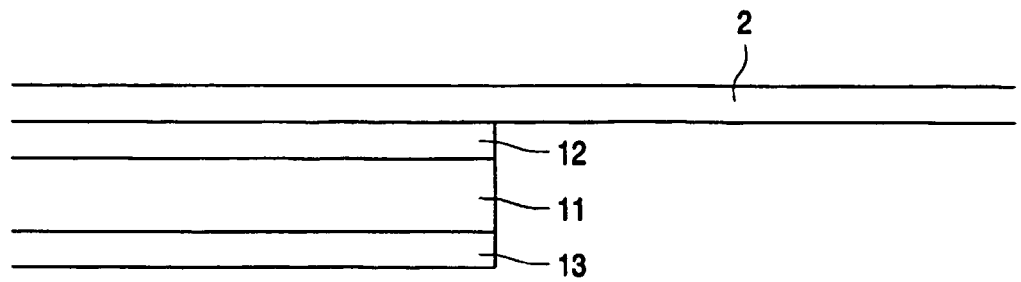
FIG. 3 is a diagrammatic cross-section of a part of another mirror device according to the invention.

FIG. 3 shows a part of a mirror according to the invention in which a liquid crystal display 11 is used, comprising a further optical element 12 viz. a ½ λ plate, which is placed between the linear polarization selective mirror 2 and a polarizer or a linear polarizing mirror 16. If necessary the device is provided with a reflector 13.

FIG. 4 shows the working principle of this mirror. The display 11 emits linearly polarized light 15 of a first polarization direction 15', either directly or by having the light passing the polarizer or a linear polarizing mirror 16. The polarization directions of the mirrors 2,16 make an angle of 90 degrees.

Incident light 20 reflects partly (one polarization direction, in this Example indicated as 20') on the mirror 2 (arrow 21). If the switchable half-lambda plate 12 is "off" (FIG. 4a) or "inactive" the remaining part (other polarization direction, in this Example indicated as 20") passes said switchable half-lambda plate 12 and is reflected on the linear polarizing mirror 16. After reflection the reflected light having polarization direction 20" passes the switchable half-lambda plate 12 and the linear polarization selective mirror 2 again (arrow 22). As a result, substantially all incident light is then reflected.

In this situation the polarized light of polarization direction 15' from the display passes the linear polarizing mirror 16 and the linear polarization selective mirror 2 and the switchable half-lambda plate 12, but is blocked by the linear polarization selective mirror 2.

If the half-lambda plate 12 is "on" (FIG. 4b) or "active" it rotates the polarization direction (15") of the display light between both mirrors 2,16 to the other polarization direction (15'), making the stack transparent for the emitted display light. In that case the polarization direction 20' of the incident light 20 will pass the switchable half-lambda plate 12 and not be reflected by the liquid crystal display 11. the other polarization direction indicated as 20" will be reflected by the linear polarizing mirror 16 (indicated as 20''') and then pass the switchable half-lambda plate 12 and the linear polarization selective mirror 2 (arrow 23). So the device can be switched between a display state (half lambda plate "on", in this example transparent for emitted light) and a mirror state (half lambda plate "off") reflecting all incident light.

A switchable half lambda plate can e.g. be realized with known LCD techniques by using a standard planar LCD cell with anti-parallelly rubbed orientation layer and filled with a liquid crystal such that the optical retardation d.Δn is equal to a range of about 200 to 450 nm. Alternatively, a vertically aligned LC cell can be used with some pre-orientation with respect to the switching direction. In that case higher birefringent LC mixtures can be used while a modulation voltage adjusts the retardation.

In another embodiment the switchable LCD cell substrates are provided with electrodes and orientation layers, in which the direction of orientation make an angle of 90° with each other. This so-called twisted nematic (TN) mode is especially beneficial when the the product of thickness and birefringence of the liquid crystal is in the so-called first minimum of the Gooch and Tarry curve making the halfwave function insensitive for the wavelength of the visible light.

Also additional films may be utilized in order to improve the effect on viewing angle. Often when a switchable retarder is brought in between the front reflective polarizer and the second reflective polarizer the initially neutrally colored image will add some color at wider viewing angles. This effect is well understood in terms of angular dependent birefringence of the liquid crystal material and can be compensated for by additional retardation layer such as a negative C-plate or tilted retardation layers.

In this respect also an Plane Switching (IPS) mode may be used, in which in the "off" state LC molecules are parallel to a polarizer (no retardation) while in the "on" state the LC molecules are aligned at 45 degrees to the polarizers (half lambda plate)

FIG. 5 shows a further embodiment, which is very suitable to reduce reflections. The switchable optical element now is a switchable polarizing filter 14 provided at the viewing side of the polarizing mirror. The display 11 emits linear polarized light 15 of a first polarization direction 15'. The polarization direction of the filter 14 and that of the polarizing mirror 2 is the same (15'). So, independently of the state of the polarizing filter 14, the emitted light from the display stack is transmitted and not affected.

Incident light 20 partly (one polarization direction, in this Example indicated as 20") passes the switchable polarizing filter 14. If the switchable polarizing filter 14 is "off" (FIG. 5a) this part of the light, indicated as 20" is reflected on the linear polarization selective mirror 2. After reflection (arrow 21) the reflected light having polarization direction 20" passes the switchable polarizing filter 14 again (arrow 22). The other part of the light (having polarization direction 20') is transmitted through the mirror 2 and ultimately absorbed in the bulk of the display. As a result, about half of the incident light is then reflected.

If the polarizing filter 14 is "on" (FIG. 5b), it now absorbs the light having polarization direction 20" that in FIG. 5a was passed and reflected at the mirror 2. The other component (20') passes the mirror 2 and is absorbed in the display again. As a result, no incident light is reflected. Consequently the stack can be switched between a display state (filter "on") suppressing reflections and a mirror state (filter "off") (partly) reflecting incident light.

For the switchable polarizer several possibilities exist. In one embodiment it is built-up from passive linear polarizer(s) and a switchable half lambda retarder similar to the combination in FIG. 4 of the switchable half-lambda plate 12 and the linear polarizing mirror 16. Such a stack will always be a polarizer, but with a switchable orientation axis.

Another switchable polarizer is provided by the so-called Guest-Host system: dichroic dye molecules are dissolved in a nematic or chiral nematic liquid crystal (LC) layer. The dye molecules (Guest) are oriented by the presence of the LC molecules (Host). Applying an electric field to the layer will re-orient the LC molecules and the dye molecules will follow this re-orientation. Such a stack will either absorb light of one polarization or be transparent. Some suitable dyes that can be added to liquid crystal mixtures are shown in FIG. 6.

In the embodiment of FIGS. 4 and 5 when the switchable optical element (polarizing filter 14, half-lambda plate 12) is "off" no power is required, resulting in full reflection of the incident light (in this state the display itself may be off, since no light is transmitted, saving energy). In the "display state" the switchable optical element polarizing filter 14, half-lambda plate 12) is "on", allowing all light from the display to pass while suppressing all incident light.

FIG. 7 shows a problem, which occurs when the device of FIG. 5 uses such a half-lambda plate or a switchable polarizer, provided by a guest-host system. These components are based on anisotropically oriented LC molecules 25, the orientation properties due to aligning at walls 26, 27 being similar to those of LCDs, viz. angular preference for one specific direction 28, dependent on orientation conditions, voltages etcetera. Due to this angle dependence a viewer 29 can be looking at the mirror instead of the emitting display, whereas another viewer 29' sees the display and not the mirror.

To a lesser extent this also occurs in the device of FIG. 3 due to the switchable half lambda plate being realized with LCD techniques.

According to the invention making domains in the alignment layer on which the LC molecules orient provides a multiple domain structure (a patterned structure). Methods to obtain multiple domain structures include are well know in the LCD art and comprise a.o. photo alignment by use of mask exposure and rubbing in combination with lithography between the various rubbing procedures.

The result is shown in FIG. 8, which shows a device having two or more domains with orientations optimized for different viewing directions 28, 28' combined. Both viewers 29, 29' now see the display and not the mirror. In principle this difference in orientation is done on a picture element level. Also more than two, e.g. four orientation directions are possible.

Another advantage, especially, when using a switchable polarizer, provided by a guest-host system, is the attenuation of undesired reflections, especially when used in the display-mode. By introducing a multiple domain structure $30^a$, $30^b$ in the polarizing filter 14 (or in half-lambda plate 12) however, the dye molecules 31 are oriented such that they absorb a greater part of the oblique incident light (see FIG. 8a). Light ray 32 is attenuated by molecules 31 oriented along direction 33 of domain $30^b$. In a similar way the light ray 34 (which is the reflected part of ray 32 after passing mirror 2) is attenuated by molecules 31 oriented along direction 35 of domain $30^a$. In the single domain configuration of FIG. 7 the light ray 34 would have been parallel to or nearly parallel to the molecules 31 oriented along direction 35 of domain $30^a$, giving hardly further attenuation.

Thus the multiple domain guest-host system attenuates these reflections in any direction other than the viewing direction (arrows 36). Thereby multiple domains in a guest-host system dramatically contribute to improved contrast.

In the mirror mode (see FIG. 8b) the guest host system is made inactive by aligning the dye molecules parallel to the viewing direction, leading to an optimum mirror image (arrows 37). This alignment resembles the state of the multiple domains in normal LCD displays and the multiple domain state is almost lost.

The protective scope of the invention is not limited to the embodiments described. For instance, since the mirror 2 has a polarizing effect the second polarizer (or analyzer) 9 in FIG. 2 may be deleted, if wanted. If necessary the glass plate 4 and mirror 2 may be interchanged in certain applications.

Although a backlit transmissive liquid crystal display device has been described, the use of reflective liquid crystal display devices is not excluded.

On the other hand as mentioned light from e.g. an (O)LED may be polarized or it may even be attractive to use other display effects to obtain the effect of a high contrast of displayed information with respect to reflected images in mirror applications.

Also, as mentioned in the introduction, more than one display can be integrated in the mirror, whereas many other applications areas can be thought of (rear view mirrors, fitting rooms, etcetera). In some applications, if a matrix form is used, with adequate driving circuitry the switching between mirror-state and display state can be done locally.

Apart from this certain elements may be combined into one, e.g. combinations of the mirror 2 and the switchable half-lambda plate 12 or the switchable polarizer 14 may be thought of.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A polarizing mirror for viewing purposes having a first plane reflecting light of a first kind of polarization to a viewing side, the mirror passing light of a second kind of polarization and being provided with a display device at its non-viewing side, which display device during use provides light of the second kind of polarization, the polarizing mirror at its viewing side having a polarizing device being switchable between two optical states, the polarizing device comprising a liquid crystal layer between two substrates, wherein the polarizing device is adapted to orient liquid crystal molecules during one of the optical states in at least two orientation directions.

2. The polarizing mirror as claimed in claim 1 in which a portion of at least one substrate has a plurality of domains having different orientation directions for each area related to a picture element of the display device.

3. The polarizing mirror as claimed in claim 1 in which the liquid crystal layer between the two substrates comprises a dye.

4. The polarizing mirror as claimed in claim 1 in which the polarizing device comprises a patterned ½ λ retarder and a polarizer.

5. An apparatus having a viewing side and a non-viewing side, the apparatus comprising:
  a polarizing device switchable between two optical states wherein the polarizing device is configured for receiving incident light from the viewing surface and reflecting a portion of the incident light in a mirror mode so that the apparatus comprises a mirror; and a display device at the non-viewing side, the polarizing device being configured for passing light from the display device when in use so that the apparatus comprises a mirror portion and a display portion, the mirror portion reflecting the portion of the incident light and the display portion providing images from the display device;

wherein the polarizing device comprises a liquid crystal layer between two substrates, the liquid crystal display layer comprising liquid crystal molecules being orientated during one of the two optical states in at least two orientation directions.

6. The apparatus of claim 5, wherein a portion of at least one substrate has a plurality of domains having different orientation directions for each area related to a picture element of the display device.

7. The apparatus of claim 5, wherein the liquid crystal layer between the two substrates comprises a dye.

8. The apparatus of claim 5, wherein the polarizing device comprises a patterned ½ λ retarder and a polarizer.

9. An apparatus having a viewing side and a non-viewing side, the apparatus comprising:

a surface having viewing side and a non-viewing side;

a display device along the non-viewing side; and a polarizing device between the surface and the display device, the polarizing device being switchable between two optical states so that the viewing side comprises a mirror in a first mode and comprises a combination of a mirror portion and a display portion in a second mode; the mirror portion reflecting a portion of light incident on the surface from the viewing side, and the display portion passing images from the display device;

wherein the polarizing device comprises a liquid crystal layer between two substrates, the liquid crystal display layer comprising liquid crystal molecules being orientated during one of the two optical states in at least two orientation directions so that two viewers located at different areas in front of the viewing side see the images passed from the display device in the second mode.

10. The apparatus of claim 9, wherein a portion of at least one substrate has a plurality of domains having different orientation directions for each area related to a picture element of the display device.

11. The apparatus of claim 9, wherein the liquid crystal layer between the two substrates comprises a dye.

12. The apparatus of claim 9, wherein the polarizing device comprises a patterned ½ λ retarder and a polarizer.

13. The apparatus of claim 9, wherein the polarizing device is configured to attenuate undesired reflections in the second mode.

* * * * *